United States Patent
Amini et al.

(10) Patent No.: US 7,019,518 B2
(45) Date of Patent: Mar. 28, 2006

(54) NON-CONTACTING APPARATUS AND METHOD FOR MEASUREMENT OF FERROMAGNETIC METAL THICKNESS

(76) Inventors: Bijan K. Amini, 1111 Caroline St. No. 20002, Houston, TX (US) 77010;
James R. Carl, 16122 Rill La., Houston, TX (US) 77010

(*) Notice: Subject to any disclaimer, the term of this patent is extended or adjusted under 35 U.S.C. 154(b) by 0 days.

(21) Appl. No.: 09/981,775

(22) Filed: Oct. 16, 2001

(65) Prior Publication Data

US 2002/0043973 A1 Apr. 18, 2002

Related U.S. Application Data

(60) Provisional application No. 60/241,517, filed on Oct. 16, 2000.

(51) Int. Cl.
*G01B 7/06* (2006.01)
*G01R 33/12* (2006.01)

(52) U.S. Cl. .................................. 324/229; 324/220
(58) Field of Classification Search ................ 324/229, 324/228, 231, 239, 240, 238, 253, 225, 207.26, 324/220, 242
See application file for complete search history.

(56) References Cited

U.S. PATENT DOCUMENTS

| | | | |
|---|---|---|---|
| 3,574,458 A | 4/1971 | Hollis | |
| 3,617,779 A | 11/1971 | Rosenberg | |
| 3,851,236 A | 11/1974 | Dennhardt | |
| 3,995,835 A | 12/1976 | Clichy | |
| 4,679,936 A | 7/1987 | Gerharz | |
| 5,038,107 A | 8/1991 | Gianzero | |
| 5,132,623 A | 7/1992 | De | |
| 5,150,446 A | 9/1992 | Penner | |
| 5,260,661 A | 11/1993 | Vail | |
| 5,283,520 A * | 2/1994 | Martin et al. ................ | 324/220 |
| 5,426,367 A | 6/1995 | Martin | |
| 5,610,517 A | 3/1997 | Ma | |
| 5,633,182 A | 5/1997 | Miyawaki | |
| 5,654,639 A | 8/1997 | Locatelli | |
| 5,698,977 A | 12/1997 | Simpson | |
| 5,751,144 A | 5/1998 | Weischedel | |
| 5,942,894 A | 8/1999 | Wincheski | |
| 5,969,254 A | 10/1999 | Yamaguchi | |
| 6,008,657 A | 12/1999 | Suyama | |
| 6,025,721 A | 2/2000 | Vail | |
| 6,084,403 A | 7/2000 | Sinclair | |
| 6,097,532 A | 8/2000 | Harris | |
| 6,100,696 A | 8/2000 | Sinclair | |
| 6,157,195 A | 12/2000 | Vail | |
| 6,291,992 B1 | 9/2001 | van Andel | |
| 6,445,187 B1 * | 9/2002 | Montgomery et al. ...... | 324/346 |
| 2001/0015645 A1 | 8/2001 | Goldfine | |

* cited by examiner

*Primary Examiner*—Jay Patidar
*Assistant Examiner*—Subhash A Zaveri

(57) ABSTRACT

This invention pertains to a method and apparatus for determining the thickness of a ferromagnetic or paramagnetic material when only one side of the material is accessible. In one embodiment, the invention provides a method for engaging a constant signal with the ferromagnetic material for inducing a changed signal, generating a stepped saturation signal over a range of currents for engagement with the ferromagnetic material, detecting the changed signal as the saturation signal is varied over the range of currents, determining the relationship between the changed signal and the stepped saturation signal, and evaluating the thickness of the material based upon the relationship between the changed signal and the stepped saturation signal. In another embodiment, the invention provides for an apparatus comprising a transmitter for engaging a constant signal with the ferromagnetic material for creating a changed signal, a saturation device for generating a saturation signal over a range of currents for engagement with the ferromagnetic material, a receiver for detecting the changed signal as the saturation signal is varied over the range of currents, such that the relationship between the changed signal and the saturation signal is determined, and the thickness of the material based upon the relationship is determined.

9 Claims, 10 Drawing Sheets

NON-CONTACTING APPARATUS AND METHOD FOR MEASUREMENT OF FERROMAGNETIC METAL THICKNESS

CROSS REFERENCE TO RELATED APPLICATION

This application claims the benefit of U.S. Provisional Application No. 60/241,517 entitled "A Technique For Measuring The Thickness of a Ferromagnetic Metal Using Permeability Signatures" filed Oct. 16, 2000.

FIELD OF THE INVENTION

The present invention relates generally to detecting the thickness of metal. Specifically, the present invention relates to measuring the thickness of a ferromagnetic material, of known conductivity and permeability, when there is access to only one side of the material.

BACKGROUND OF INVENTION

Measuring the thickness of a ferromagnetic or paramagnetic material can be very important but extremely difficult in many applications. These types of materials, e.g., carbon steel and iron, are utilized in numerous applications. These material are selected because of their strength and durability. However, such materials are subject to corrosion or erosion over time. The most common example of corrosion is the rust that forms on such material due to oxidation. This corrosion can destroy the strength of the material. For example, a device can be associated with a logging tool and used to check oil well casings for corrosion. Another example is a device that can be mounted on or moved along the outside of a storage tank to test for corrosion inside the tank. This may be useful when access to the inside of the tank is inconvenient, difficult or costly.

In many applications, it is not possible to have access to all parts of the structural steel or iron. Examples include but are not limited to underground pipes, underground storage tanks, above ground storage tanks such as chemical tanks, and bridge and building structural elements. This is also experienced in well casings placed in the ground. The casing is subject to corrosion from the moisture in the ground on the outside of the casing as well as upon the interior surface of the casing. However, only the interior surface is accessible. The ability to monitor the changing thickness of the casing over time can provide useful information regarding the remaining strength of the casing as it experiences corrosion on the outer surface.

Methods for determining thickness in the past have included audio soundings, x-rays and gamma rays. Utilization of these alternate methods, when possible, requires physical contact with the material and frequently causes significant disruption of production activities and time consuming placement and calibration of equipment.

SUMMARY OF THE INVENTION

The thickness of a ferromagnetic or paramagnetic material, of known conductivity and permeability, can be measured when there is access to only one side of the material. For example, a device can be associated with a logging tool and used to check oil well casings for corrosion. Another example is a device that can be mounted on or moved along the outside of a storage tank to test for corrosion inside the tank. This may be useful when access to the inside of the tank is inconvenient, difficult or costly.

This technique is possible because of the non-linearity of permeability in most ferromagnetic and paramagnetic materials. At first, permeability decreases rapidly with the increasing density of the magnetic flux field. However, as the state of magnetic saturation is approached, the rate of change or decrease in permeability slows in relation to the increasing magnetic flux field intensity. The composition and the thickness of the material determines the rate of change in permeability in relation to the increase in magnetic flux field density. When the conductivity and permeability are known, the rate of change in permeability can be used to determine the thickness of the material.

In one embodiment, the present invention is a method for determining the thickness of a ferromagnetic material having known conductivity and permeability. The method comprises the step of engaging a constant signal with the ferromagnetic material for creating an changed signal. A saturation signal is generated over a range of currents and engaged with the ferromagnetic material. Then, the changed signal is monitored as the saturation signal is varied over the predetermined range of currents. Thereafter, the relationship between the changed signal and the saturation signal is determined. And then, the thickness of the material is determined based upon the relationship between the changed signal and the saturation signal.

The step of determining the relationship between the changed signal and the saturation signal may include the steps of, for a plurality of thicknesses, normalizing the changed signal, and plotting the normalized changed signal versus the saturation signal for generating a normalized curve for each thickness of material, determining the deviation of each normalized curve from a standard curve for each thickness of material, and determining a total deviation associated with each normalized curve for each thickness.

Also, the step of evaluating the thickness of the material based upon the relationship between the changed signal and the saturation signal may include the steps of deriving a function from the relationship of the deviation of each normalized curve for each thickness of material, and evaluating the thickness of the material based upon the function such that for any deviation a thickness can be determined.

In another embodiment, the present invention is a method for determining the thickness of a ferromagnetic material having known conductivity and permeability. The method comprises the step of determining the thickness of a ferromagnetic material having known conductivity and permeability, which comprises engaging a constant signal with the ferromagnetic material for inducing a changed signal, generating a swept-current saturation signal over a range of currents for engagement with the ferromagnetic material, detecting the changed signal as the saturation signal is swept over the range of currents, determining the relationship between the changed signal and the swept-current saturation signal, evaluating the thickness of the material based upon the relationship between the changed signal and the swept-current saturation signal. The step of determining the relationship between the changed signal and the swept-current saturation signal, comprises, for a plurality of thicknesses, normalizing the changed signal, plotting the normalized changed signal versus the swept-current saturation signal for generating a normalized curve for each thickness of material, determining the deviation of each normalized curve from a standard curve for each thickness of material, and determining a deviation associated with each normalized curve for each thickness. The step of evaluating the thickness of the material based upon the relationship between the changed signal and the swept-current saturation signal, further comprises deriving a function from the relationship of the deviation of each normalized curve for each thickness of material, and evaluating the thickness of the material based upon the function such that for any deviation a thickness is determined.

In yet another embodiment of the present invention, an apparatus is provided for determining the thickness of a ferromagnetic material having known conductivity and permeability. The apparatus comprising a transmitter for engaging a constant signal with the ferromagnetic material for inducing a changed signal, a saturation device for generating a saturation signal over a range of currents for engagement with the ferromagnetic material, and a receiver for detecting the change in transmitter signal as the saturation signal is varied over the range of currents. The relationship between the changed signal and the saturation signal is determined, and the thickness of the material based upon the relationship is evaluated.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

Figure 1:
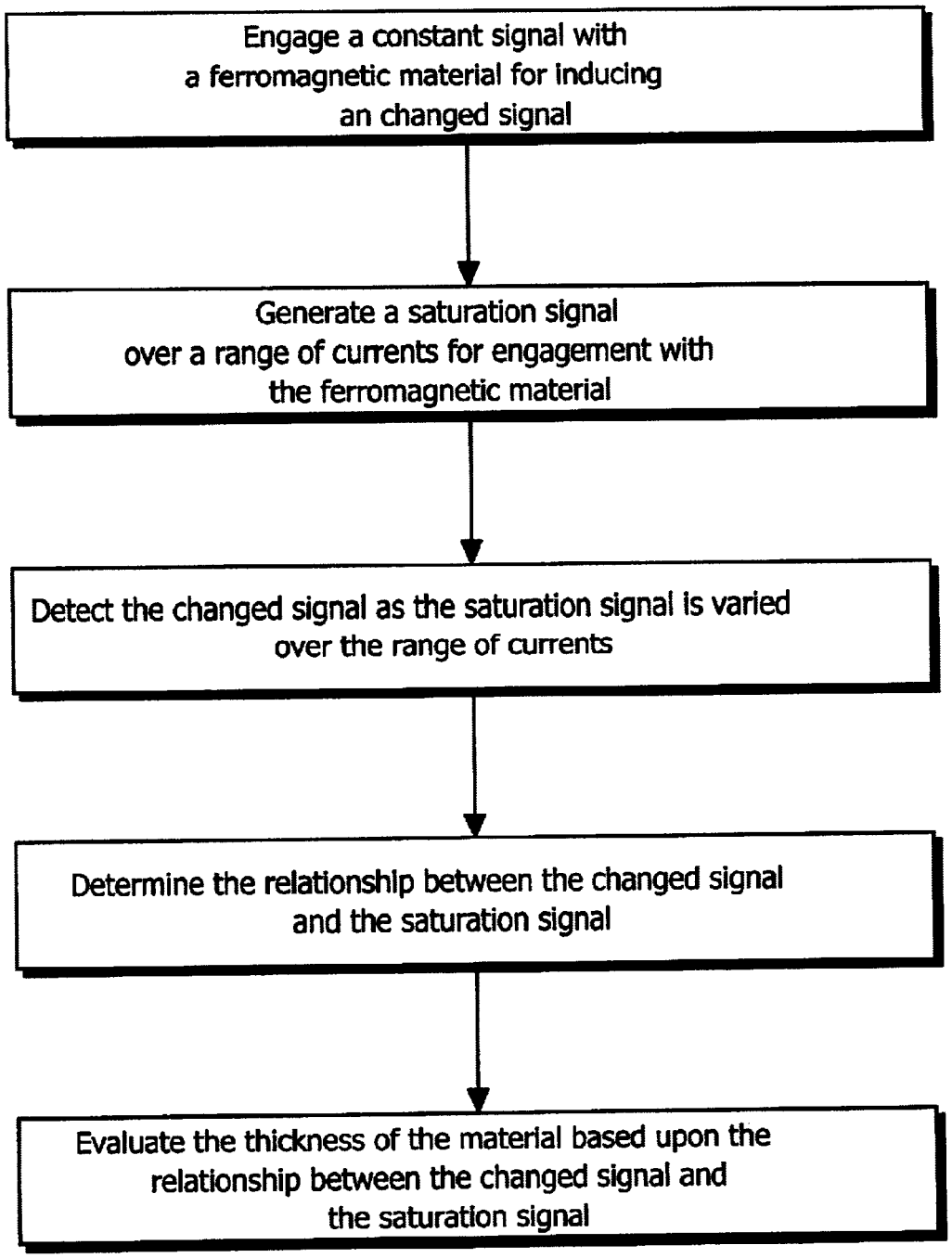
FIG. 1 is flow chart illustrating a methodology of the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

The thickness of a ferromagnetic material, paramagnetic material or material containing ferromagnetic alloys of known conductivity and permeability, can be measured when there is access to only one side of the material. This can be achieved even when the accessible portion of the material is otherwise covered with paint or an insulting coating. Embodiments of the present invention can include a device used in conjunction with a well logging tool. In this manner, the device can be utilized to measure the oil well casing for corrosion or other defects. In another embodiment, the device can be mounted on or moved along the outside of a storage tank to test for corrosion or other deterioration on the inside the tank. This may be useful when access to the inside of the tank is inconvenient, difficult or costly.

This technique is possible because of the non-linearity of changes in relative permeability in most ferromagnetic and paramagnetic materials. As the material is first subjected to increasing intensity of a magnetic field, the permeability of the material decreases at a relatively rapid rate. However, as the state of magnetic saturation is approached, the rate of change (decrease) in permeability slows in relation to the increasing magnetic field intensity. The composition and the thickness of the material determine the rate of change in permeability in relation to the increase in magnetic flux density. When the conductivity and permeability of the material is known, the measured rate of change of relative permeability of the material when coupled with varying known quantities of magnetic flux can be used to determine the thickness of the material. For example, if it is known that a well casing is made of a specific content of carbon steel, the permeability and conductivity of this material can also be ascertained either from published information or separately measured data. Therefore, variations in the measured rate of change in relative permeability of the subject well casing can be utilized to ascertain the thickness of the well casing.

The first step of the method of the invention can be collecting measured values of the signal voltage received from separate specimens of the material wherein each specimen is a sample of the same material but each specimen having a different measured thickness. At least three specimens of identical materials, varying only in thickness, are required. It may be preferred that the difference in thickness be of a uniform magnitude, e.g., 0.25, 0.50, 0.75, 1.0 inches etc. Multiple sets of measurements can also be made of the test samples using differing frequencies of oscillating transmitter flux ("transmitter signal"). Due to the skin depth effect, it may be useful to test with multiple frequencies of transmitter signals. It will be appreciated that the optimum transmitter signal frequency may vary across a spectrum of material thickness. The length and width of specimens should also be of sufficient uniform size so that the "edge effect" will not vary the measured signal from the sample.

FIG. 1 is flow chart illustrating a methodology of the present invention. FIG. 1 describes the present invention as five steps. However, one skilled in the art can appreciate that other, more and fewer steps may be used in practicing the present invention. A method is illustrated for determining the thickness of a ferromagnetic material having known conductivity and permeability. The steps illustrated in FIG. 1 include (a) engaging a fixed transmitter signal ("constant signal") with the ferromagnetic material for inducing a changed signal, (b) generating a saturation signal over a range of currents for engagement with the ferromagnetic material, (c) detecting the changed signal as the saturation signal is varied over the range of currents, (d) determining the relationship between the induced changed signal and the stepped saturation signal, and (e) evaluating the thickness of the material based upon the relationship between the changed signal and the stepped saturation signal.

Figure 1A:
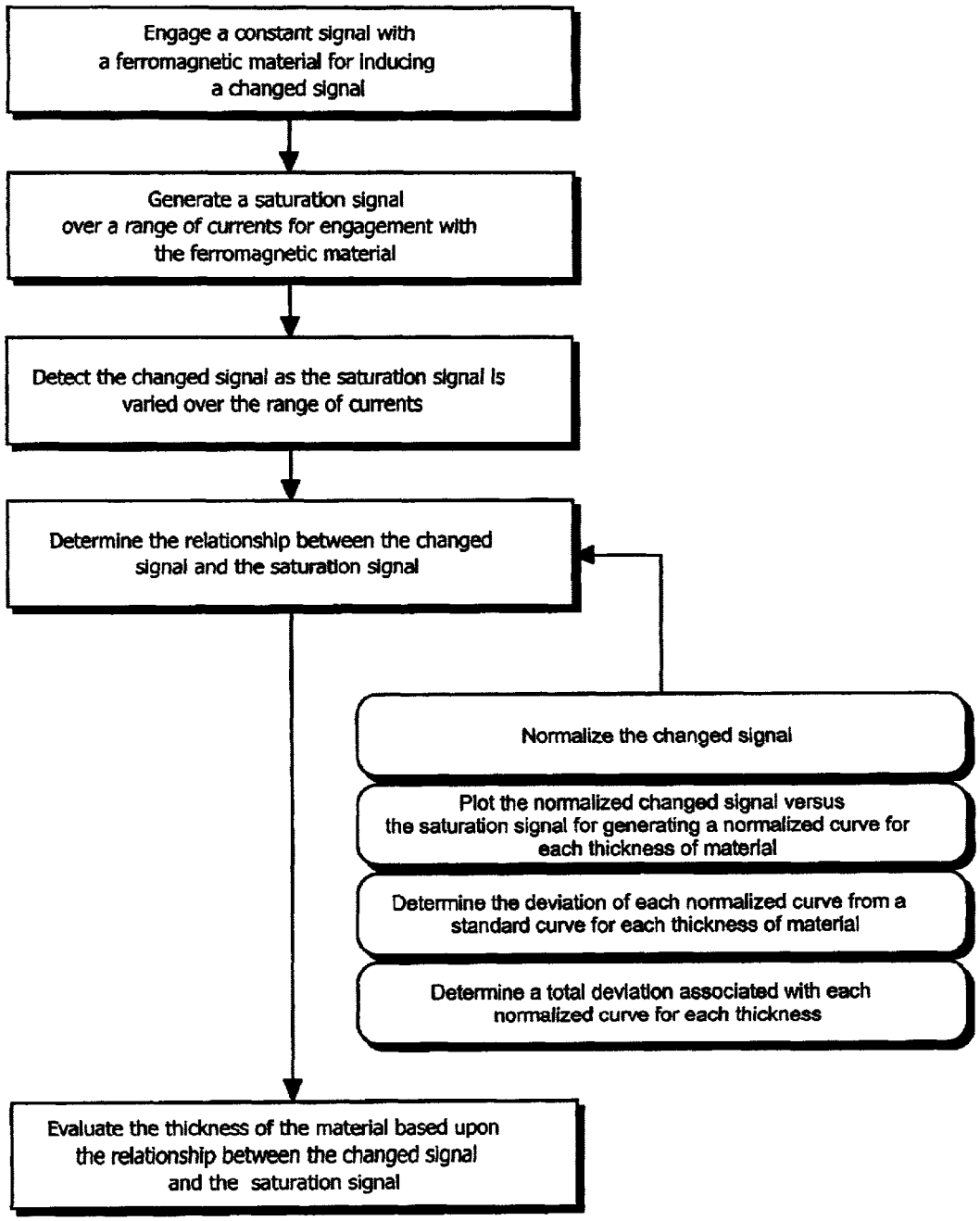
FIG. 1A is flow chart illustrating another methodology of the present invention.

FIG. 1A is flow chart illustrating another methodology of the present invention. The steps illustrated in FIG. 1A include (a) engaging a constant signal with the ferromagnetic material for inducing a changed signal, (b) generating a saturation signal over a range of currents for engagement with the ferromagnetic material, (c) detecting the changed signal as the saturation signal is varied over the range of currents, (d) determining the relationship between the changed signal and the stepped saturation signal, and (e) evaluating the thickness of the material based upon the relationship between the changed signal and the stepped saturation signal. The step (d) of determining the relationship between the changed signal and the stepped saturation signal further includes (1) for a plurality of thicknesses, normalizing detected variations of the changed signal, (2) plotting the normalized values of the changed signal versus the stepped saturation signal for generating a normalized curve for each thickness of material, (3) determining the deviation of each normalized curve from a standard curve for each thickness of material, and (4) determining a total deviation associated with each normalized curve for each thickness. The deviation technique can be any known technique, such as for example, least squares, linear total, etc.

Figure 1B:
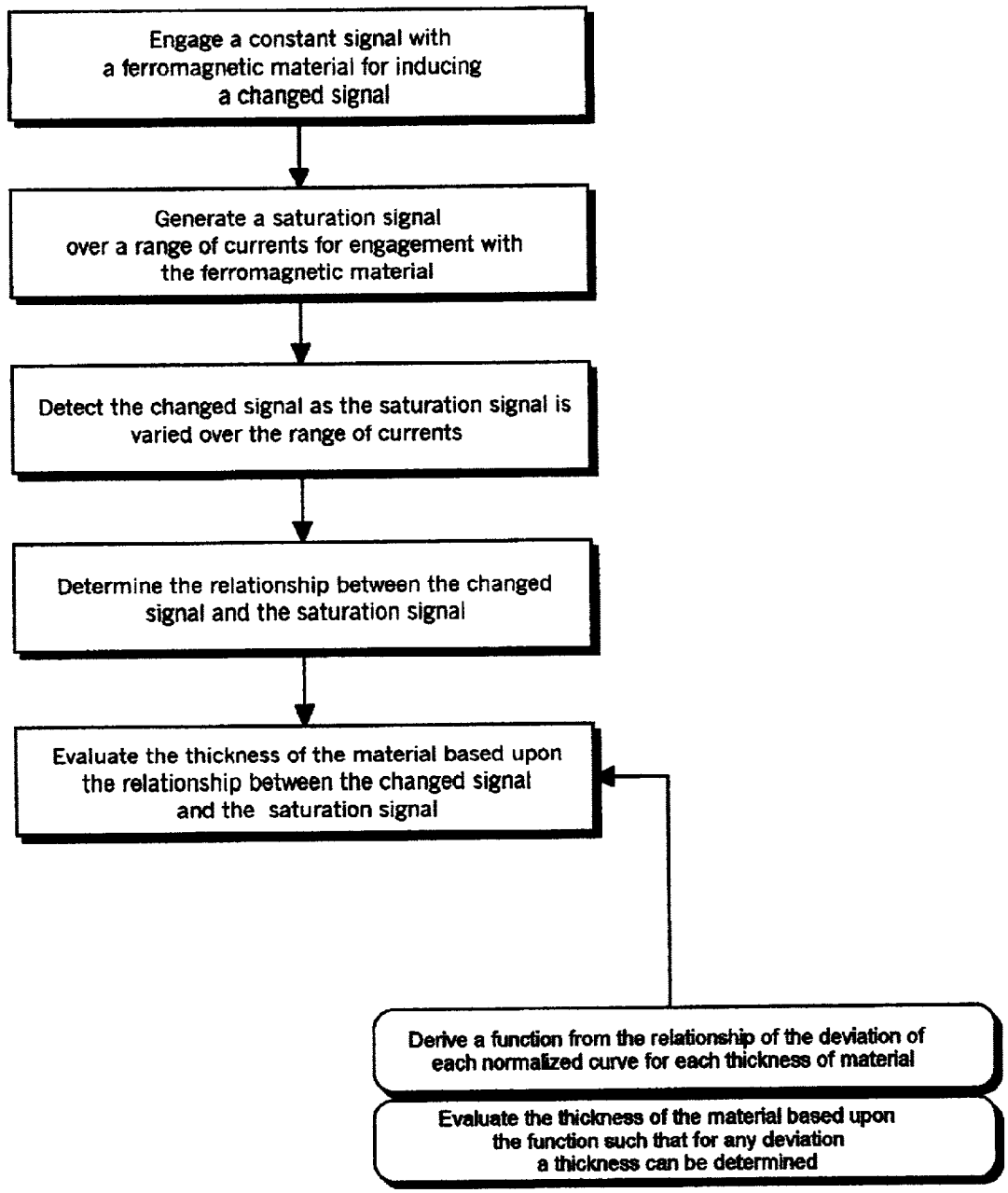
FIG. 1B is flow chart illustrating another methodology of the present invention.

FIG. 1B is flow chart illustrating another methodology of the present invention. The steps illustrated in FIG. 1A include (a) engaging a constant signal with the ferromagnetic material for inducing a changed signal, (b) generating a saturation signal over a range of currents for engagement with the ferromagnetic material, (c) detecting the changed signal as the saturation signal is varied over the range of currents, (d) determining the relationship between detected variations of the changed signal and the stepped saturation signal, and (e) evaluating the thickness of the material based upon the relationship between the changed signal and the stepped saturation signal. The step (e) of determining the relationship between the changed signal and the stepped saturation signal further includes (1) deriving a function from the relationship of the deviation of each normalized curve for each thickness of material, and (2) evaluating the thickness of the material based upon the function such that for any deviation a thickness can be determined.

Figure 2:
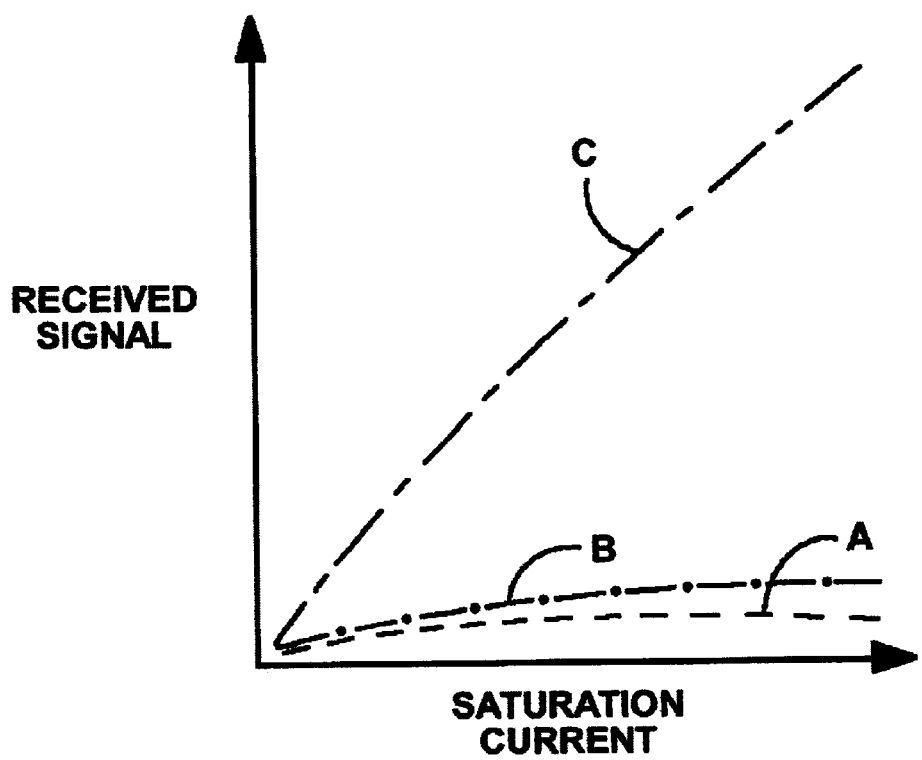
FIG. 2 is a graph of received or changed signal versus saturation current for three samples of the same material with each sample A, B and C having a different thickness.

FIG. 2 is a graph of received or changed signal versus saturation current for three samples of the same material with each sample A, B and C having a different thickness. For example, sample A may represent a thickness of ¼", sample B may represent a thickness of ½", and sample C may represent a thickness of ¾".

Figure 3:
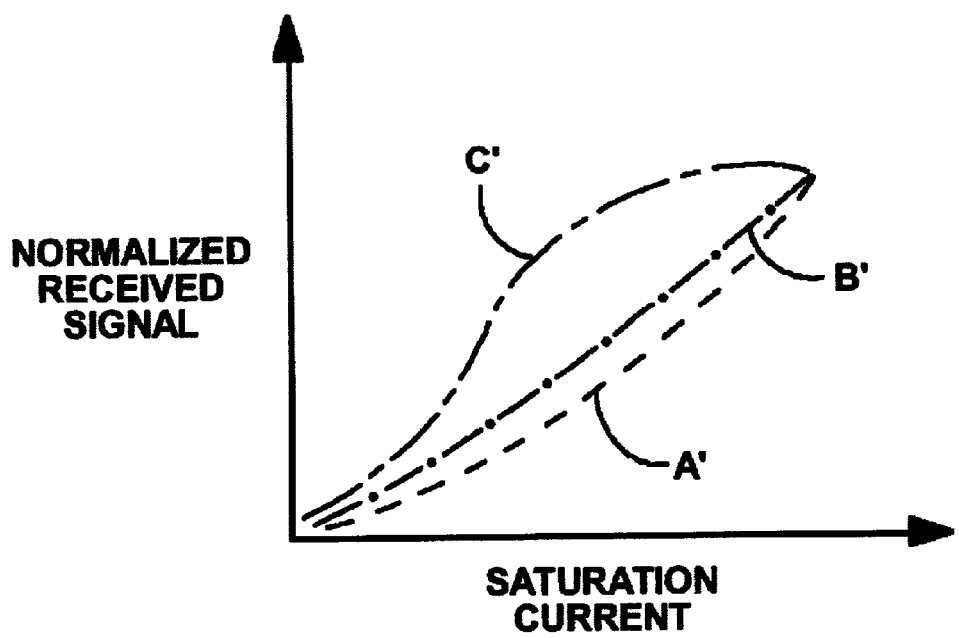
FIG. 3 is a graph of received or changed signal versus saturation current for the three samples of the same material as illustrated in FIG. 2 which samples have been normalized A', B' and C' to a maximum voltage value of one.

FIG. 3 is a graph of received or changed signal versus saturation current (or saturation signal) for the three samples of the same material as illustrated in FIG. 2 which samples have been normalized A', B' and C' to a maximum voltage value of one. The present invention provides that any normalization procedure can be used.

Figure 4:
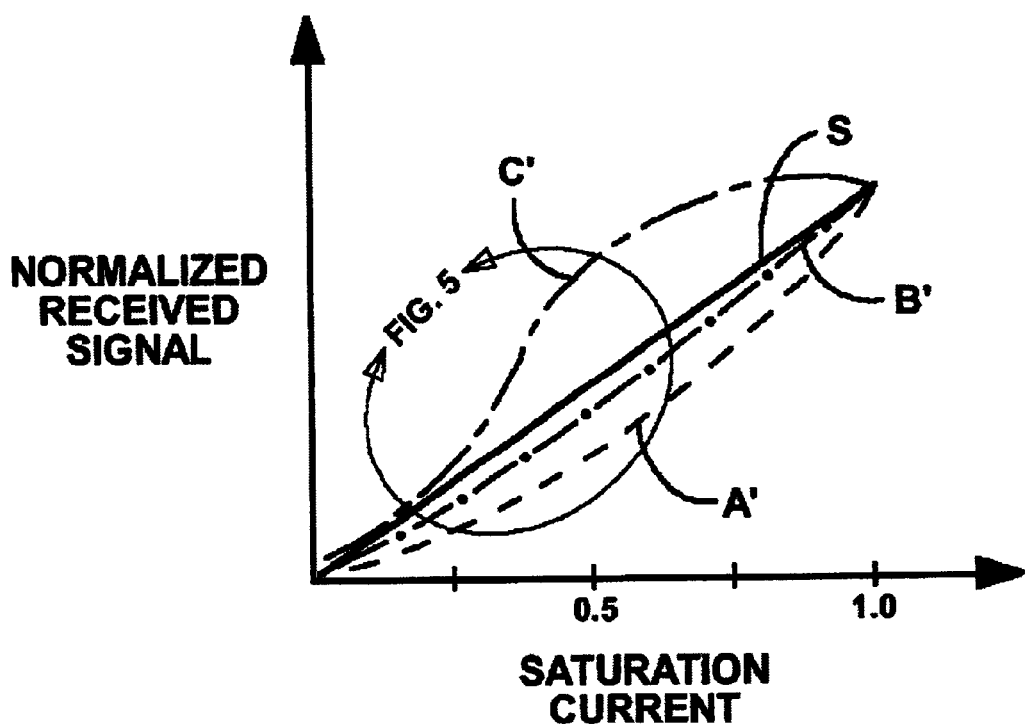
FIG. 4 is the normalized graph of received or changed signal versus saturation current as illustrated in FIG. 3 plotted against a standard which is plotted from zero to one.

FIG. 4 is the normalized graph of received or changed signal versus saturation current as illustrated in FIG. 3 plotted against a standard which is plotted from zero to one. The normalized samples A', B' and C' have been altered to a maximum voltage value of one. The standard curve S is a 45° line drawn from 0 to 1. It can be appreciated by those skilled in the art that any standard can be used and that certain standards may be more readily adaptable for specific uses that other standards.

Figure 5:
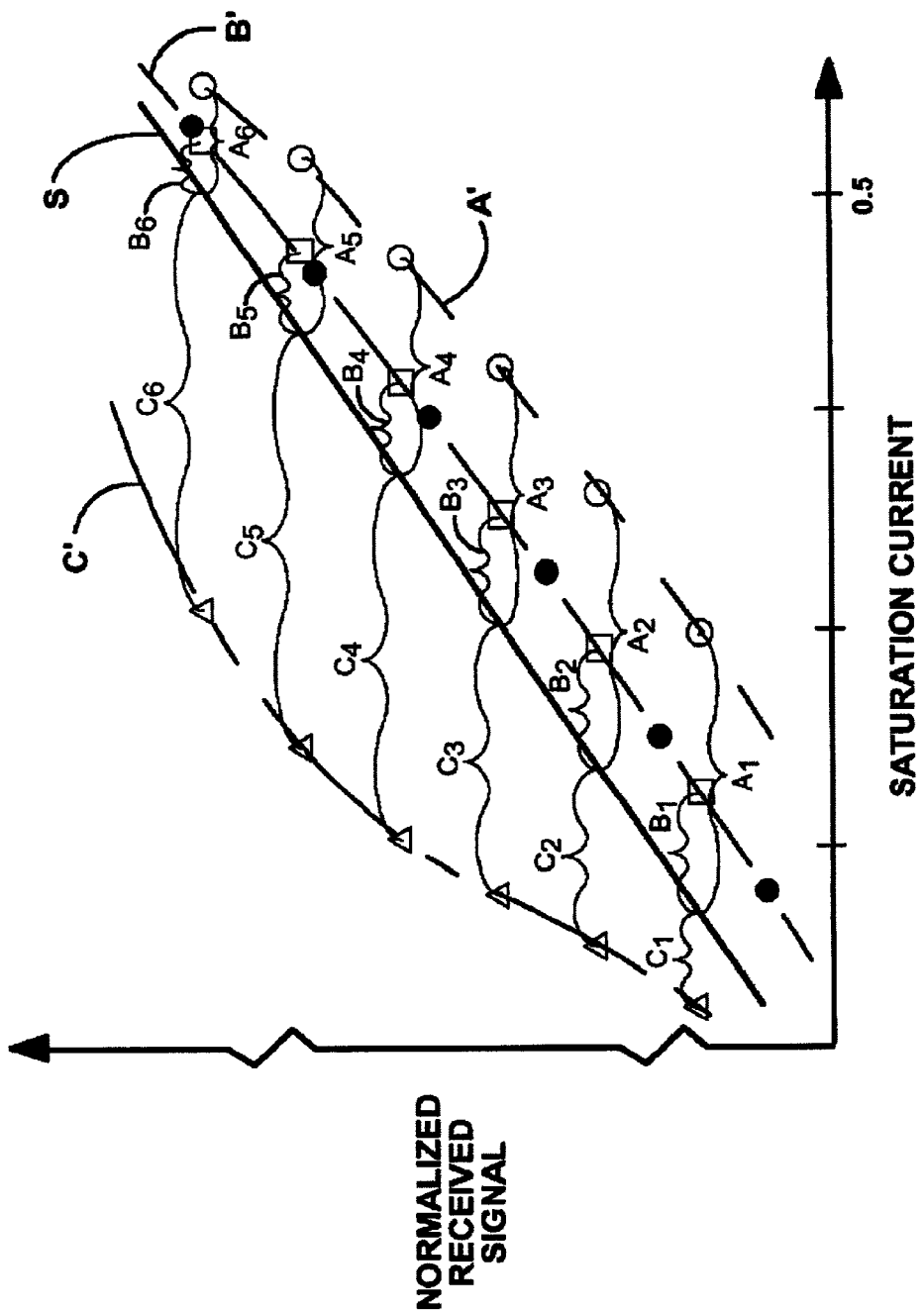
FIG. 5 is an exploded portion of FIG. 4 illustrating a method of calculating the total deviation of the three normalized sample curves A', B' and C'.

FIG. 5 is an exploded portion of FIG. 4 illustrating the method of calculating the total linear deviation of the three normalized sample curves A', B' and C'. The points along sample curve A' are linearly related to the standard curve S, i.e., the horizontal difference is determined. For sample curve A', the deviation values $A_1, A_2, A_3, A_4, A_5$ and $A_6$ are determined, and the total linear deviation is calculated for sample curve A'. For sample curve B', the deviation values $B_1, B_2, B_3, B_4, B_5$ and $B_6$ are determined, and the total linear deviation is calculated for sample curve B'. Similarly, for sample curve C', the deviation values $C_1, C_2, C_3, C_4, C_5$ and $C_6$ are determined, and the total linear deviation is calculated for sample curve C'.

Figure 6:
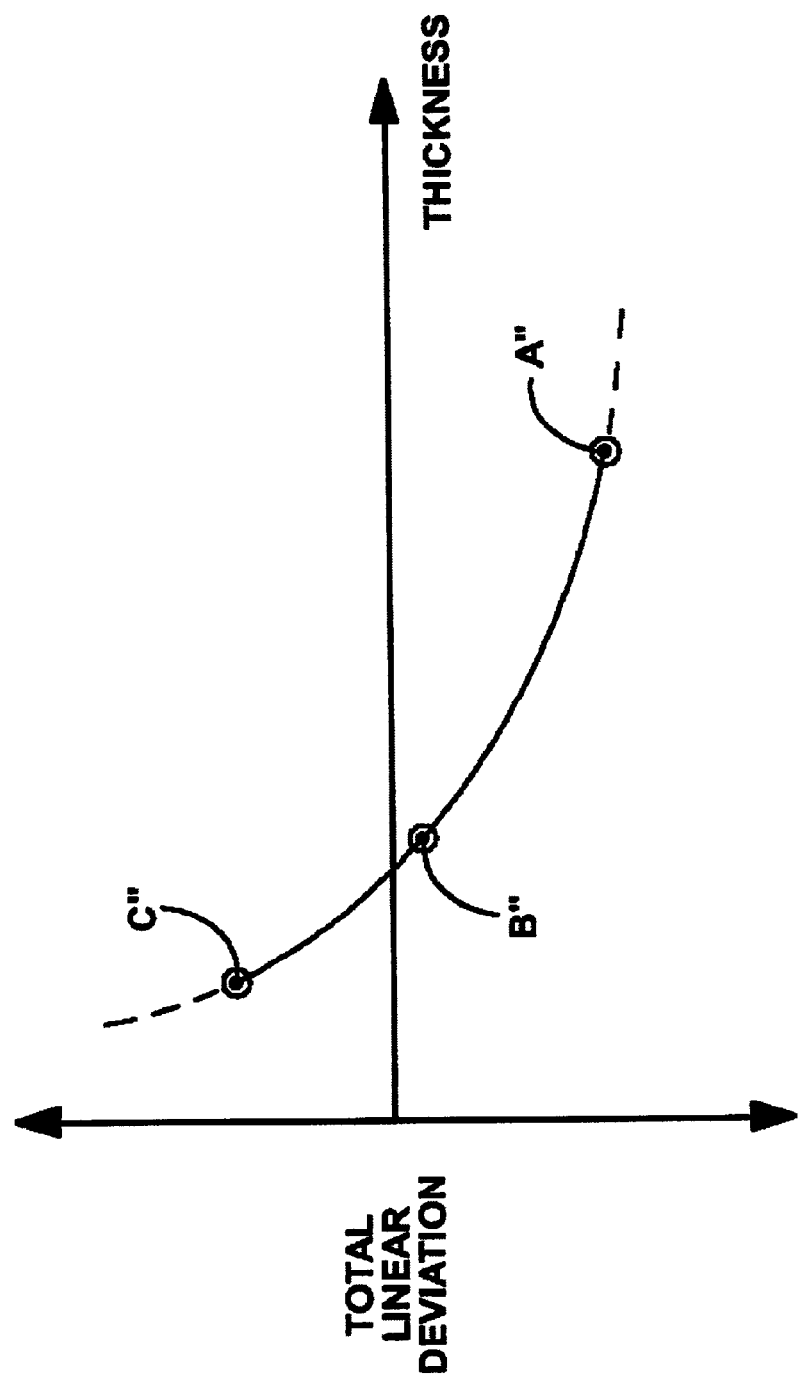
FIG. 6 is a graph of the total linear deviation versus the material thickness (A", B" and C") for the three normalized sample curves A', B' and C' in FIGS. 3, 4 and 5.

FIG. 6 is a graph of the total linear deviation versus the material thickness (A", B" and C") for the three normalized sample curves A', B' and C' in FIGS. 3, 4 and 5. The total deviation points A", B" and C" are plotted. A curve is fitted through the points. The curve fitting can be, for example, with splines or any other technique. From the curve fitting, a function can be derived that can be used to determine an unknown thickness of a known material for which a deviation curve has been created using the present invention. Alternately, the present invention can be adapted to provide a "look-up" table rather than using the function, when determining an unknown thickness of a known material for which a deviation curve has been created.

It is known and appreciated that standard statistical techniques should be applied. For example, the more sample points used the better the sample approximates the desired population sought to be described. Thus, although only a small number of sample points are provide for in the present description of the invention, the required number of sample points can be readily determined and used for the specific situation under investigation.

Figure 7A:
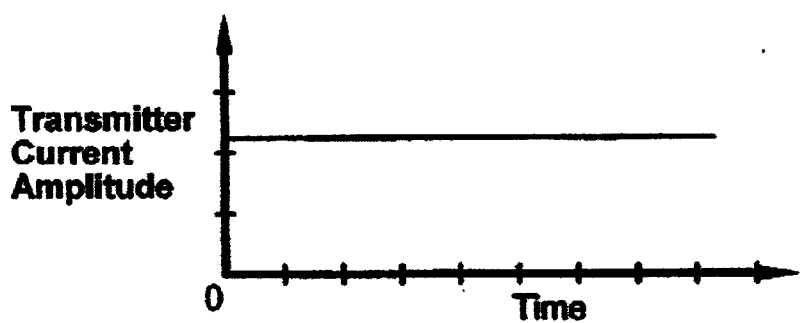
FIGS. 7A, 7B and 7C illustrate the relationship between a constant transmitter signal (termed "transmitter current amplitude" in FIG. 7A), a varying saturation signal (termed "saturation current amplitude" in FIG. 7B), and the amplitude of the receiver signal or changed signal (termed "receiver current amplitude" in FIG. 7C).
Figure 7B:
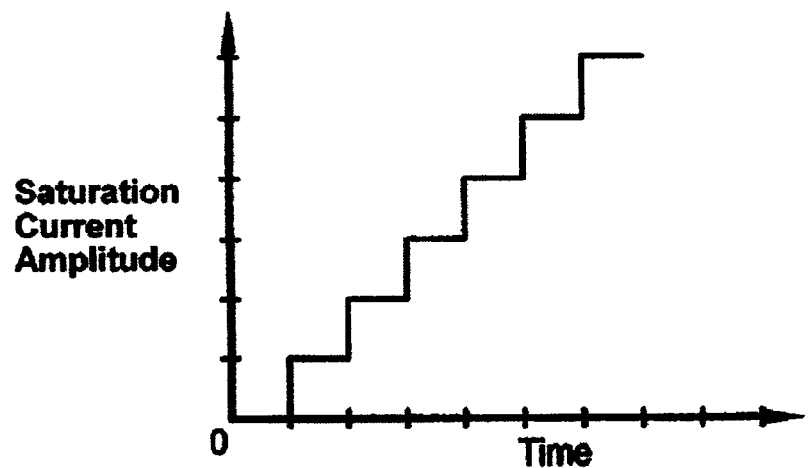
Figure 7C:
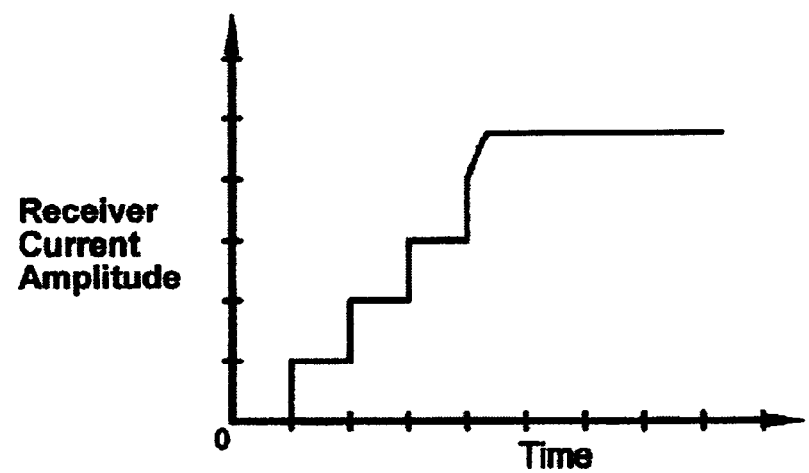

FIGS. 7A, 7B and 7C illustrate the relationship between the amplitude of the oscillating transmitter signal (termed "transmitter current amplitude" in FIG. 7A), the varying amplitude of the saturation signal current (termed "saturation current amplitude" in FIG. 7B), and the amplitude of the changed signal or receiver signal (termed "receiver current amplitude" in FIG. 7C). FIGS. 7A, 7B and 7C illustrate this method for a single transmitter flux frequency understood to have constant amplitude and frequency engaging the material. While monitoring the received response and holding the frequency and amplitude of the transmitter signal constant, the current of the saturation signal is increased incrementally. Thus, the receiver signal will generally mirror the increased current of the saturation signal steps but at different amplitudes than the transmitter signal. A receiver device is used to monitor the results of the transmitted signal returning or induced electromagnetic response. As the saturation current increases, the material becomes more and more magnetically saturated and the relative magnetic permeability of the material decreases. The material thereby becomes increasing "transparent" or "translucent" (and therefore less of a barrier) to an oscillating magnetic signal. The increasing "translucence" of the material results in an increased induced or changed signal of a magnitude related to the increase in saturation current. The current of the saturation signal is increased and the received signal is monitored. The transmitter signal is maintained constant, i.e., a "constant signal" until there is no detected change in the receiver or induced signal, i.e., the "changed signal." The point at which there is no detected change is deemed to be total or near total magnetic saturation of the material.

FIG. 7A illustrates the transmitter flux maintained at a constant amplitude and frequency. FIG. 7B illustrates the multiple stepped increase in saturation current, with presumed increase in saturation flux intensity, engaged or coupled with the material. FIG. 7C illustrates the progressive increase in receiver signal as the material becomes increasingly more transparent to the constant transmitter flux due to the increased saturation flux intensity and resulting lowering of relative permeability. Once total saturation occurs additional saturation current has no affect on the received signal. This is because the receiver signal is a functionally related to the quantity of transmitter flux that penetrates through the material. Thus, the transmitted signal is coupled with the metal and the metal is now transparent to the transmitted signal.

Figure 8:
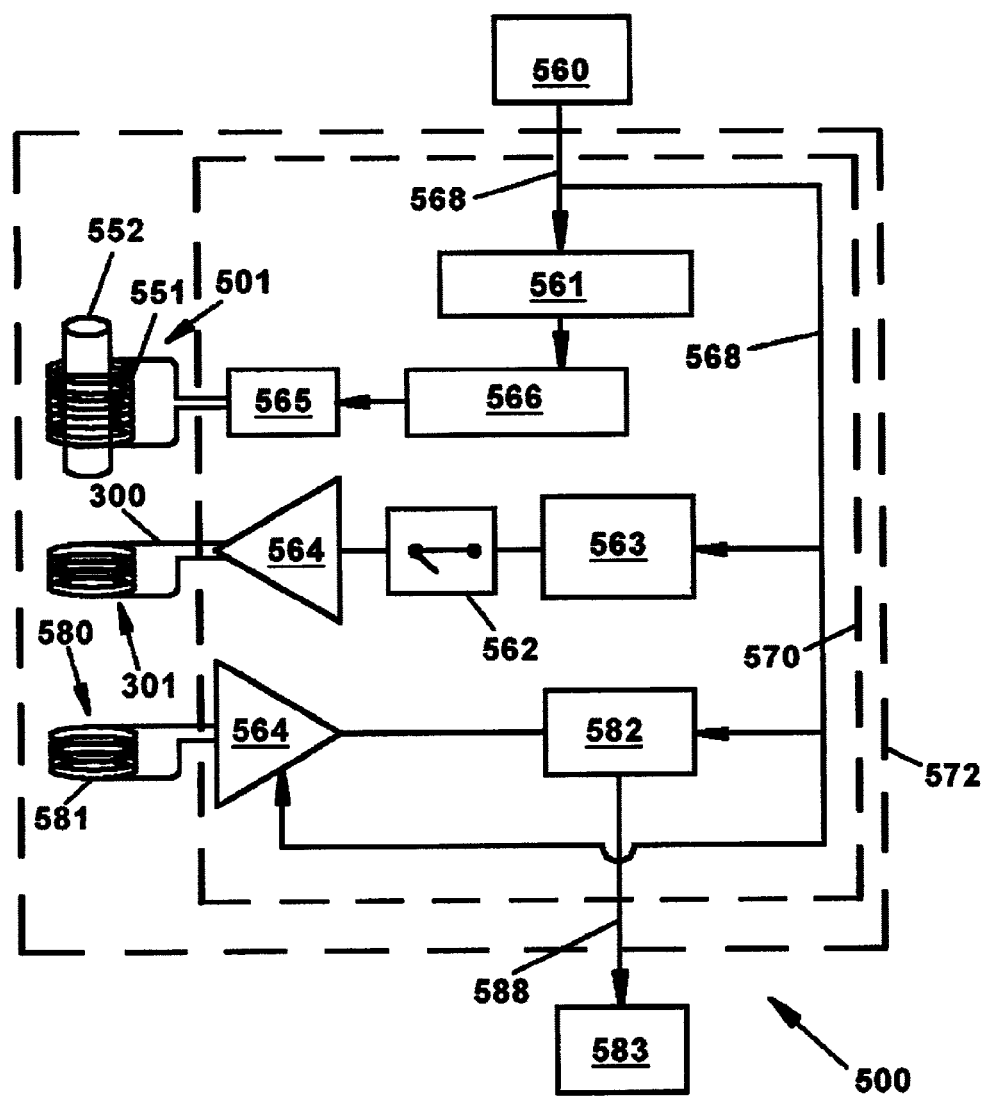
FIG. 8 is a schematic of one embodiment of the apparatus of the present invention.

FIG. 8 is a schematic of one embodiment of the apparatus of the present invention. The interior working of one embodiment of an apparatus 500 of the present invention is shown in FIG. 8. FIG. 8 illustrates schematically one embodiment of the components of the apparatus 500 of the invention. The components of the apparatus 500 are contained within a tool housing 572. The apparatus 500 includes (a) a magnetic saturation generator 501 capable of creating a near magnetic saturation within the material and including one or more saturation coils 551, (b) a magnetic flux transmitter component 300 capable of creating oscillating magnetic flux of controlled frequency and amplitude, comprising the transmitter coil 301, a switch 562, and a low noise amplifier (LNA) 564, (c) a receiver component 580 for the detection and measurement of induced or penetrating magnetic flux of the material and comprising a receiver coil 581, (d) a frequency generator 563, (e) a pulser 566, (f) one or more capacitors 561 and (g) a nulling device 582. The magnetic saturation generator 501 includes the saturation coil 551, saturation core or magnetic culminator (not shown). The magnetic saturation generator 501, saturation coil 551, the transmitter 300, transmitter coil 301 and any associated core (not shown), the receiver 580, including the receiver coil 581. The output display 583, operator controls (not shown) and power source 560 may be typically be linked to the housing 572 by means of standard cables and connectors 568 and 588. The operator's console or display 583 is also provided.

FIG. 8 illustrates an embodiment utilizing a high voltage 560B and low voltage 560A power source. The low voltage power source may be utilized for the transmitter flux generator 300 and for the digital flux processor. The high voltage power source 560B may be used with an amplifier for desired amplification of the transmitter flux. A dc power supply 560 is preferably used for generating the saturation flux emitted from the saturation coil 551. It may also be found to be advantageous to utilize an analog to digital flux converter. It is envisioned that a digital flux converter, as well as other sub-components, may be contained within an electronic component 570.

The saturation coil 551 is a principle element of the magnetic saturation generator 501. It may be utilized in conjunction with one or more transmitter components, receiver components, or combinations of both. The saturation coil 551 generates a magnetic flux (saturation signal) that engages (or couples) with and saturates the material. The current of the saturation signal can be varied in a controlled manner, thereby allowing control of the level of magnetic saturation of the material. The transmitter coil 301 is a principle element of the transmitter component ("transmitter") 300. The transmitter 300 creates the oscillating magnetic flux ("transmitter flux") that engages with and is transmitted through a magnetically saturated portion of the material (not shown).

When the material is partially saturated with magnetic flux comprising the saturation signal, the transmitter signal comprising oscillating flux from one or more additional 300, may readily penetrate into (couple with) the material. Preferably, the saturation coil 551 generates a constant dc powered signal or a low frequency signal. The transmitter signal, generated by the transmitter 300, will preferably be at a higher frequency, e.g., higher by a multiple of 10, than any oscillation of the saturation signal. In a preferred embodiment of the invention, the transmitter has the capability to generate a plurality of separate transmitter signals, each having distinct frequencies.

The receiver 580 may be combined with a separate saturation coil 551, thereby allowing the receiver 580 to be placed away from the transmitter 300. This has a number of advantages, including facilitating nulling of the transmitter signal (of the transmitter 300) and receiver 580. An embodiment of the tool 500 of the present invention in which the transmitter 300 and receiver 580 are located proximate to separate magnetic saturation generators is termed a "bistatic arrangement" or "bistatic configuration."

The saturation coil 551 and saturation core 552, the transmitter coil 301 and the receiver coil 581, are often depicted separately from the other components described above and depicted within the "electronics component" 570 in FIG. 8. For clarity, many of the drawings contained within this specification do not depict the electronics component. Further, the drawings may show an illustration of a coil only, but may be variously labeled as a magnetic saturation generator, transmitter or receiver. It is understood that the other components or sub-components are deemed to be included as necessary. In addition, the components of the invention, including but not limited to the saturation coil 551, transmitter coil 301 and receiver coil 581 are not placed in physical contact with the material.

Figure 9:
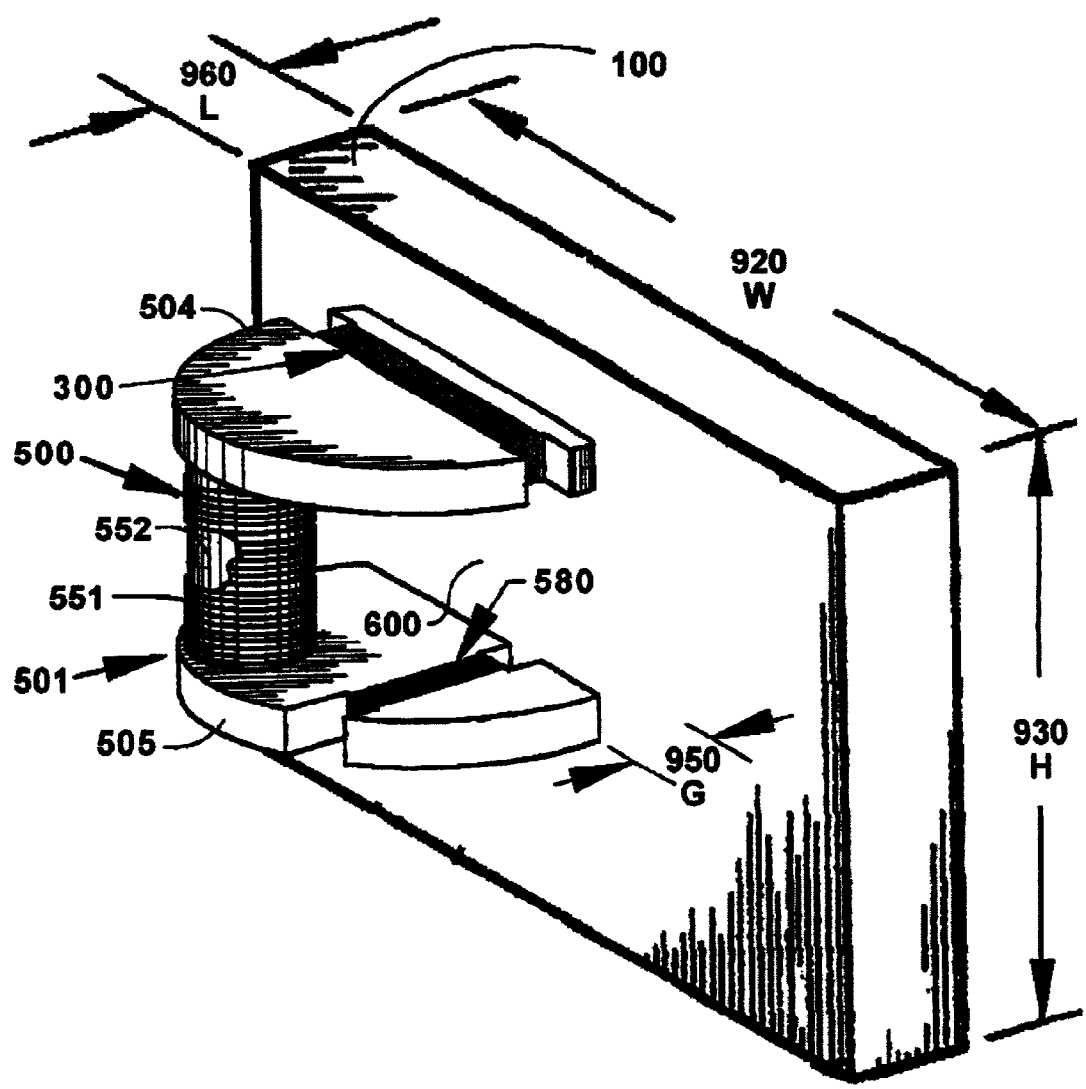
FIG. 9 illustrates one embodiment of the apparatus of the present invention, particularly showing the relationship between the component for generating a magnetic flux for saturation, the transmitter generating an oscillating flux and the receiver coil for receiving the changed signal.

"FIG. 9 illustrates on embodiment of the apparatus of the present invention particularly showing the relationship among the component for generating a magnetic flux for saturation, the transmitter generating an oscillating flux, the receiver coil for receiving the changed signal and the material to be measured."

"FIG. 9 illustrates one embodiment of a magnetic transparency generator or apparatus 500 of the present invention. The apparatus 500 is used to generate the transparency current required in practicing the present invention. The magnetic transparency generator/apparatus 500 provide for containing flux lines to completely saturate the intended material 100 volume region. Also, FIG. 9 illustrates one embodiment of the flux circuit core 501 for use with the present invention. The flux circuit core 501 comprises a top flange 504, a bottom flange 505 and a core 552. The core 552, upon which the coils of the electromagnet are wrapped, is located between the top flange 504 and bottom flange 505. The material 100 is also illustrated. The complete magnetic transparency generator 500 incorporates the flux circuit core 501 for providing a transparent volume region that is illustrated having a width W 920, a height H 930 and a thickness L 960. The space or gap between the magnetic transparency generator 500 and the material 100 is illustrate by G 950. The barrier volume region may be termed the target material. It is appreciated that the transmitter coils 300, the receiver coils 580 and the transparency coil 551 are in positions of geometric nulling with respect to the magnetic transparency generator of apparatus 500 illustrated of the present invention."

The above described method of the present invention can be used to classify various materials and associated thickness related to specified levels of saturation current and transmitter flux of specified amplitude and frequency such that a general lookup table can be created for any material. The general lookup table can contain known results from numerous test samples allowing for quick lookup and display of thicknesses based on known samples meeting the test criteria. The test criteria can be for a range of thicknesses for specified materials having the same permeability and conductivity. A differing test criteria, e.g. transmitter flux frequency, range of saturation current or range of stepped changes in saturation current, may be developed for different ranges of thickness of the same material.

It will be appreciated that the data may be manipulated in differing ways to achieve a desired distinction in values associated with differing material thickness. These variations are deemed to be part of the methodology of this invention.

When the total deviation is found for each of the thickness signatures, an empirical equation can be determined. FIG. 6 illustrates the empirical equation for the total deviation curve shown in FIG. 6. It will be appreciated that the related equation may be specific for each material measured at a specified transmitter flux frequency. Using the appropriate calculated empirical equation for the material and the transmitter flux frequency, the thickness can be determined from any set of measurements for the same material. It may be advantageous to use a differing transmitter frequency for differing ranges of thickness of the same material. For a different ferromagnetic or paramagnetic material, it may also be desirable to choose a different transmitter frequency or frequency range to exaggerate the curvature of the received voltage versus saturation current plot to yield maximum sensitivity to the thickness measurement. Of course, a different material or a different frequency will require a different empirical equation for thickness versus deviation. A new equation can be found rapidly by computer curve fitting methods. For each new application, this process would have to be repeated to find the appropriate empirical equation for the ferromagnetic material of interest.

There are variations on this approach that are obvious to those skilled in the art and are covered by the present invention. There are many ways that the signatures can be processed to derive thickness. For example, the slope of the signature curves, or deviations or variances at a single saturation value.

In another embodiment, the specimen may be coupled with a set comprising a plurality of controlled constant signals generated by one or more transmitter and each with separate frequency or amplitude concurrent with the variation of the saturation sign. Any received signal from the specimen is recorded for each differing transmitter signal. Note the amplitude and frequency of each transmitter flux comprising the set are maintained constant during the controlled variation or sweep of the saturation signal current. The record the detected changed receiver signals from each specimen using the multiple constant transmitter signals will create multiple data points for each variation of the saturation signal current level. It will be appreciated that this increased number of data points will provide enhanced resolution of the recorded signal. Further, using this embodiment for measurement of thickness may permit greater accuracy of computed thickness with fewer adjustments of the saturation signal current. This may achieve a saving of both time and expense without loss of resolution or accuracy. In addition, this embodiment achieves a signature for the material of differing thickness, based upon a unique relationship among the detected values of changed signal for the differing transmitter signals at each recorded level of current of the saturation signal. The frequency and amplitude of the transmitter signal is recorded and maintained constant and is related to received change signals. The value of the saturation current and transmitter frequency for each measurement of receiver signal is also recorded.

In one embodiment, not illustrated here, actual field measurements of the same material, but of unknown thickness, can be normalized and graphed. The resulting curve can be compared to the curves illustrated on the look up table and an approximation of thickness made from this comparison. In another embodiment, a single field data point, again (i) based upon recorded measurement of saturation current (ii) with the same transmitter flux frequency and amplitude, and (iii) normalized in the same manner, may be compared with the look up table. If the normalized data point is located on only one curve for a given thickness, an approximation of thickness can be made. In yet another embodiment, all data points may be plotted without normalization in a lookup table or chart and the field data point can be compared with these plotted curves.

The invention includes the apparatus capable of generating a magnetic field ("saturation signal") of variable intensity and impinging or coupling this field with the material intended to be measured. The apparatus also includes the ability of generating one or more oscillating magnetic fields of constant amplitude and frequency and to receive oscillating magnetic flux. The apparatus of the invention therefore includes the capability of generating magnetic flux to magnetically engage and saturate material of varying thickness utilizing a "magnetic saturation generator", transmitting oscillating magnetic flux into or through the material, measuring any induced and varying oscillating magnetic flux ("changed signal").

By altering the concentration of the saturation flux, preferably by controlled adjustment of the saturation current, it is possible to vary the relative permeability of the target material simultaneously coupled with an oscillating transmitter flux of constant amplitude and frequency, thus building a detailed characterization profile of the material at various degrees of magnetic saturation.

The apparatus of the present invention has various components or systems that work in the following steps: (1) a magnetic saturation system (magnetic saturation generator) containing a saturation coil, mounted on a ferromagnetic core (saturation core) that is not easily saturated. When the saturation coil is energized, it acts as an electromagnet. This includes saturation (dc) coil or coils, and transmitter coil or coils. The saturation coil creates one or more fields of magnetic flux (saturation flux) adjacent or near the material. The strength or intensity of the magnetic field can be varied in a controlled manner. The saturation flux couples with the material and creates a partial magnetic saturation of the material proximate to the saturation coil. This coupling with the saturation flux results in the relative magnetic permeability of the target material being reduced. When partially saturated, the material acquires greater capacity to engage or couple with oscillating magnetic flux, especially magnetic flux oscillating at relatively high frequencies. When fully saturated (or nearly fully saturated), that portion of the material cannot effectively absorb further magnetic flux, thereby allowing additional flux to pass through the material. This partially saturated material is termed transparent or translucent to further magnetic flux. (2) A transmitter/ receiver system, comprised of one or more magnetic transmitter signal components (transmitters) and each utilizing one or more coils (transmitter coil) located proximate to the saturated material can be used to create one or more fields of additional magnetic flux oscillating at constant controlled. This oscillating magnetic flux (transmitter signal) is engaged with the material coupled with saturation signal having significantly reduced magnetic permeability. This enhances ability of the transmitter signal to penetrate into, i.e., couple with, the material. The transmitter/receiver system also includes one or more separate coils (receiver coil). The receiver coil is similar to that used to create the transmitter signal, but preferably without a core of magnetically permeable material. The receiver coil is placed near the same or similar segment of the material coupled with a saturation signal so that it may detect (receive) any changed signal. The receiver component, included within the transmitter/receiver system, converts the changed signal into an electrical signal that may be filtered and processed in order to characterize the changed signal, e.g., receiver signal voltage. (3) An electronic and geometric nulling system to obtain an accurate measurement of permeability. Geometric nulling positions the transmitter, receiver and saturation coils in the optimum locations for the particular system designed. Various designs are provided yielding excellent results. Also, an electronic nulling circuit can simultaneously null all of the frequencies at once. The transmitter signal is compared to the received changed signal and, using the changes in amplitude and phase, the magnitude of this received signal (changed signal) due to the coupling of oscillating magnetic transmitter signal and varied or adjusted current of the saturation signal may be determined and displayed.

Pursuant to practicing the present invention as described herein, one skilled in the art will know and appreciate how to arrange the transmitter, receiver and saturation coils in optimum locations for the particular system being used, and will know and appreciate how to simultaneously null all of the frequencies at once to provide electronic nulling.

One embodiment of the apparatus will include the ability to generate and send a plurality of transmitter signal of differing frequencies, either simultaneously or sequentially. Also a frequency or swept frequency source that is generally in the audio range, and an appropriate receiving and detection system is incorporated.

Further modifications and alternative embodiments of this invention will be apparent to those skilled in the art in view of this specification. Accordingly, this specification is to be construed as illustrative only and is for the purpose of teaching those skilled in the art the manner of carrying out the invention. It is to be understood that the forms of the invention herein shown and describe are to be taken as the presently preferred embodiments. Various changes may be made in the shape, size and arrangement of parts. For example, equivalent elements may be substituted for those illustrated and described herein and certain features of the invention may be utilized independently of the use of other features, all as would be apparent to one skilled in the art after having the benefit of this description of the invention.

What is claimed is:

1. A method for determining the thickness of a ferromagnetic material having a known conductivity and permeability comprising the steps of:
   (a) engaging the ferromagnetic material with an electrically isolated constant signal that is an electromagnetic signal of constant frequency and amplitude for inducing a changed signal within the ferromagnetic material,
   (b) generating a stepped saturation signal over a range of currents that is electrically isolated from the ferromagnetic material for engagements with the ferromagnetic material,
   (c) detecting by electrically isolated means the changed signal as the saturation signal is varied over the range of currents,
   (d) determining the relationship between the changed signal and the stepped saturation signal, and
   (e) evaluating the thickness of the material based upon the relationship between the charged signal and the stepped saturation signal.

2. The method defined in claim 1 for determining the thickness of a ferromagnetic material having known conductivity and permeability wherein the step of determining the relationship between the changed signal and the stepped saturation signal comprises the steps of:
   (a) for a plurality of thicknesses, normalizing the changed signal,
   (b) plotting the normalized changed signal versus the stepped saturation signal for generating a normalized curve for each thickness of material,
   (c) determining the deviation of each normalized curve from a standard curve for each thickness of material, and
   (d) determining a total deviation associated with each normalized curve for each thickness.

3. The method defined in claim 1 for determining the thickness of a ferromagnetic material having known conductivity and permeability wherein the step of evaluating the thickness of the material based upon the relationship between the changed signal and the stepped saturation signal comprises the steps of:
   (a) deriving a function from the relationship of the deviation of each normalized curve for each thickness of material, and
   (b) evaluating the thickness of the material based upon the function such that for any deviation a thickness can be determined.

4. A method for determining the thickness of a ferromagnetic material having known conductivity and permeability comprising the steps of:
   (a) engaging a constant signal with the ferromagnetic material for inducing a changed signal,
   (b) generating a saturation signal over a range of currents for engagement with the ferromagnetic material,
   (c) detecting the changed signal as the saturation signal is varied over the range of currents,
   (d) determining the relationship between the changed signal and the saturation signal, further comprising:
      (1) for a plurality of thicknesses, normalizing the changed signal,
      (2) plotting the normalized changed signal versus the stepped saturation signal for generating a normalized curve for each thickness of material,
      (3) determining the deviation of each normalized curve from a standard curve for each thickness of material, and
      (4) determining a deviation associated with each normalized curve for each thickness, and
   (e) evaluating the thickness of the material based upon the relationship between the changed signal and the saturation signal, further comprising:
      (1) deriving a function from the relationship of the deviation of each normalized curve for each thickness of material, and (2) evaluating the thickness of the material based upon the function such that for any deviation a thickness is determined.

5. An apparatus or determining the thickness of a ferromagnetic material having known conductivity and permeability while said apparatus is electrically isolated from the material comprising:
(a) a transmitter electrically isolated from the ferromagnetic material for engaging the ferromagnetic material with a constant signal that is an electromagnetic signal having constant frequency and amplitude for inducing a change signal within the ferromagnetic material,
(b) a saturation device electrically isolated from the ferromagnetic material for generating a saturation signal over a range of currents for engagement with the ferromagnetic material,
(c) a receiver electrically isolated from the ferromagnetic material for detecting the changed signal as the saturation signal is varied over the range of currents, such that the relationship between the changed signal and the saturation signal is determined, and the thickness of the material based upon the relationship is determined.

6. A method for determining the thickness of a ferromagnetic material having a known conductivity and permeability comprising the steps of:
(a) engaging the ferromagnetic material with a constant signal electrically isolated from the ferromagnetic material for inducing an changed signal,
(b) generating an electrically isolated swept saturation signal over a range of current for engagement with the ferromagnetic material,
(c) detecting by electrically isolated means the change signal as the saturation signal is swept over the range of currents,
(d) determining the relationship between the changed signal and the swept saturation signal, and
(e) evaluating the thickness of the material based upon the relationship between the changed signal and the swept saturation signal.

7. The method defined in claim 6 for determining the thickness of a ferromagnetic material having known conductivity and permeability wherein the step of determining the relationship between the altered transmitter signal and the swept-frequency saturation signal comprises the steps of:
(a) for a plurality of thicknesses, normalizing the changed signal,
(b) plotting the normalized changed signal versus the swept saturation signal for generating a normalized curve for each thickness of material,
(c) determining the deviation of each normalized curve from a standard curve for each thickness of material, and
(d) determining a deviation associated with each normalized curve for each thickness.

8. The method defined in claim 6 for determining the thickness of a ferromagnetic material having known conductivity and permeability wherein the step of evaluating the thickness of the material based upon the relationship between the changed signal and the swept saturation signal comprises the steps of:
(a) deriving a function from the relationship of the deviation of each normalized curve for each thickness of material, and
(b) evaluating the thickness of the material based upon the function such that for any deviation a thickness can be determined.

9. A method for determining the thickness of a ferromagnetic material having known conductivity and permeability comprising the steps of:
(a) engaging a constant signal with the ferromagnetic material for creating an changed signal,
(b) generating a saturation signal over a range of currents for engagement with the ferromagnetic material,
(c) detecting the changed signal as the saturation signal is varied over the range of currents,
(d) determining the relationship between the changed signal and the saturation signal, further comprising:
  (1) for a plurality of thicknesses, normalizing the changed signal,
  (2) plotting the normalized changed signal versus the saturation signal for generating a normalized curve for each thickness of material,
  (3) determining the deviation of each normalized curve from a standard curve for each thickness of material, and
  (4) determining a deviation associated with each normalized curve for each thickness, and
(e) evaluating the thickness of the material based upon the relationship between the changed signal and the saturation signal, further comprising:
  (1) deriving a function from the relationship of the deviation of each normalized curve for each thickness of material, and
  (2) evaluating the thickness of the material based upon the function such that for any deviation a thickness is determined.

* * * * *